United States Patent [19]

Yoshida et al.

[11] Patent Number: 4,706,932
[45] Date of Patent: Nov. 17, 1987

[54] FLUID CONTROL VALVE APPARATUS

[75] Inventors: Kunihiko Yoshida, Ibaraki; Kenichi Koshi, Tsuchiura; Nobuhiko Ichiki, Ibaraki, all of Japan

[73] Assignee: Hitachi Construction Machinery Co., Ltd., Tokyo, Japan

[21] Appl. No.: 514,274

[22] Filed: Jul. 15, 1983

[30] Foreign Application Priority Data

Jul. 16, 1982 [JP] Japan .................. 57-122902

[51] Int. Cl.⁴ ............................ F16K 31/12
[52] U.S. Cl. .................. 251/31; 251/30.01; 251/282; 251/900; 91/454; 137/596.16
[58] Field of Search ............ 251/129.01, 129.05, 251/129.15, 129.16, 129.07, 30.01, 31, 282, 900; 137/596.14, 596.16; 91/454, 459, 461

[56] References Cited

U.S. PATENT DOCUMENTS 2,852,039 9/1958 Dotter ..................... 251/31
3,215,159 11/1965 Nixon ..................... 251/282
3,972,267 8/1976 Hook et al. ............. 91/454
4,345,736 8/1982 Zeuner et al. ........... 91/459

FOREIGN PATENT DOCUMENTS 2041170 9/1980 United Kingdom ........ 251/282

Primary Examiner—James C. Yeung
Assistant Examiner—Noah P. Kamen
Attorney, Agent, or Firm—Antonelli, Terry and Wands

[57] ABSTRACT

A fluid control valve apparatus comprises logic valve means including a valve housing, a first valve member defined in the valve housing, and an axially movable valve body arranged in the first valve chamber, with the valve body including opposite end portions and a conical surface portion brought into contact with the conical surface portion when the valve body is moved in a valve closing direction. First and second hydraulic fluid chambers are defined in the valve housing and communicate with each other when the conical surface portion is out of contact with the valve seat and out of communication when the conical surface portion contacts the valve seat. A first pilot chamber in the valve housing, adjacent one end portion of the valve body, biases the valve body in a closing direction by a first pilot pressure signal. A second valve chamber is defined in the valve housing with an extension of the valve body being formed by extending the other end portion of the valve body through the first hydraulic fluid chamber, and is arranged in the second valve chamber for axial movement. An independent second pilot chamber biases the valve body in an opening direction by a second pilot pressure signal.

20 Claims, 14 Drawing Figures

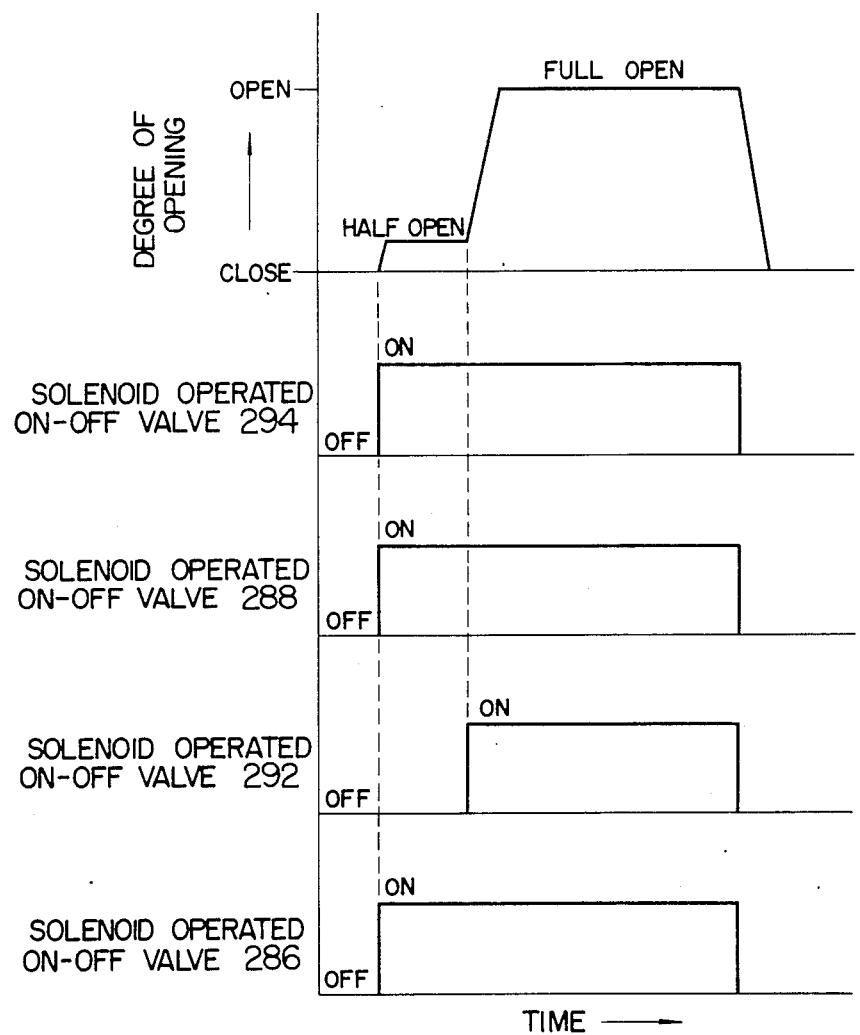

FLUID CONTROL VALVE APPARATUS

BACKGROUND OF THE INVENTION

This invention relates to fluid control valve apparatus equipped with logic valve means operative in response to pilot pressure signals, and, more particularly, to a fluid control valve apparatus of the type described which has particular utility in controlling a supply of hydraulic fluid to a hydraulic actuator in a hydraulic fluid circuit for a hydraulic construction machine, such as, for example, a hydraulic excavator.

In prior art hydraulic construction machines, such as hydraulic excavators, been usual practice to use fluid control valve apparatus of the type including spool type directional control valves is used for controlling a supply of hydraulic fluid to the hydraulic actuator. A disadvantage of this type of directional control valves resides in the fact that, since a sliding gap is necessary between the spool valve body and the valve casing, internal leaks of the fluid through the gap is unavoidable and, when the actuator is a cylinder, an inadvertent gravitational displacement of the cylinder by might occur.

Recently, proposals have been made to use poppet type logic valves to constitute fluid control valve apparatus with an eye to the advantage offered by them that internal leaks of the fluid can be eliminated.

Generally, the proposed poppet type logic valves each comprise a poppet type valve body located for movement in a valve chamber defined in a valve housing, and a conical surface portion is formed on a forward end of the valve body. The conical surface portion is brought into fluidtight contact with a valve seat formed in the valve housing when the valve body moves in a valve closing direction, to bring first and second hydraulic fluid chambers out of communication with each other. This brings a first main port formed in the first hydraulic fluid chamber out of communication with a second main port formed in the second hydraulic fluid chamber. A pilot chamber is defined between an end of the valve body opposite to the conical surface portion and the inner surface of an end cover of the valve housing, and a pilot pressure signal is applied through a pilot port formed in the end cover to the pilot chamber which has a spring mounted therein, so that the valve body is urged by the pilot pressure signal and the biasing force of the spring to move to a position in which the valve body closes the logic valve.

When the pilot pressure signal is at a reservoir pressure level (zero or substantially zero), a flow of pressurized fluid from the first main port to the second main port acts on the pressure receiving area of the valve body which corresponds to the diameter of the valve body and forces same to move upwardly to bring the first and second main ports into communication with each other. A flow of pressurized fluid from the second main port to the first main port acts on the annular pressure receiving area of the valve body which corresponds to the difference between the diameter of the valve body and the diameter of the valve seat and forces same to move upwardly to bring the first and second main ports into communication with each other.

When the pilot pressure valve reaches a predetermined high pressure level or the pilot port is blocked, the valve body is forced to move upwardly by the pressure at the first and second main ports is interrupted, thereby bringing the first and second main ports out of communication with each other.

When the fluid control valve apparatus equipped with logic valves of the aforesaid construction is used in a hydraulic fluid circuit including a hydraulic actuator for controlling a supply of hydraulic fluid to the hydraulic actuator, the first and second main ports are connected to main circuit lines thereof, and the pilot port is connected through a pilot valve to shuttle valves connected to the main circuit lines and a reservoir, so that the pilot port is able to selectively introduce into the pilot chamber as a pilot pressure signal either a highest pressure in the hydraulic fluid circuit or a reservoir pressure. When the hydraulic actuator is connected to a hydraulic pump in an open circuit, the logic valves used are four in number and a fluid control valve apparatus comprising four logic valves is conventional.

In the fluid control valve apparatus of the aforesaid construction, when the logic valve is to be opened, the pilot valve is actuated to introduce a reservoir pressure into the pilot port as a pilot pressure signal. This causes the main circuit line pressure in the first main port or second main port to force the valve body to move upwardly to bring the valve to an open position. When the logic valve is to be closed, the pilot valve is actuated to introduce into the pilot port as a pilot pressure signal a highest pressure in the hydraulic pressure circuit. As a result, a force tending to urge the valve body to move downwardly by the pressure in the pilot chamber overcomes a force tending to move the valve body upwardly by the main circuit line pressure in the first main port or second main port, to thereby bring the valve to a closed position.

As described hereinabove, in fluid control valve apparatus of the prior art, the logic valve is opened or closed depending on the relative magnitudes of the force tending to force the valve body to move upwardly by a pilot pressure signal and the force tending to force the valve body to move downwardly by a pressure in the first main port or second main port. Thus, the logic valve is of a construction such that the operation is essentially susceptible to the influences exerted by a variation in the pressure in the first main port or second main port. Also, in the fluid control valve apparatus in the aforesaid specific connection, the first main port or second main port of the logic valves has a main circuit line pressure of the hydraulic fluid circuit applied thereto which has a value tending to undergo a variation of high magnitude depending on the operating condition of the hydraulic actuator. Thus, the operation of the logic valves is influenced by a variation in main circuit line pressure. For example, assume that the main circuit line pressure introduced into the first and second main ports reaches a highest level of the pressure prevailing in the hydraulic fluid circuit and the highest pressure is introduced as a pilot pressure signal into the pilot port which has been brought out of communication with the reservoir when the valve is to be closed. Then the speed at which the valve is closed would become extremely low, showing poor responsiveness, since the valve body is operated only by being downwardly moved by the spring installed in the pilot chamber. Also, when the reservoir pressure is introduced into the pilot port as a pilot pressure signal to open the valve where the main circuit line pressure introduced into the main port is extremely high or when the highest circuit pressure is introduced into the pilot port as a pilot pressure signal to close the valve where the main circuit line pressure introduced into the main port is extremely low, the difference in pressure between the pressure in the main port and the pressure introduced into the pilot port as a pilot pressure signal becomes great, so that the speed at which the valve is opened or closed would become extremely high and the flow rate of the hydraulic fluid would show a sudden change, thereby giving a great shock to the hydraulic fluid circuit and the actuator. More particularly, when the speed at which the valve is closed becomes extremely high, the valve body is thrown against the valve body, so that the conical surface portion of the valve body is damaged by the valve seat. Also, abrupt blocking of communication between the first main port and second main port applies a surge pressure to the first or second main port due to the water hammer phenomenon, thereby exerting injurious influences on the hydraulic fluid circuit or actuator.

The fluid control valve apparatus of this construction has suffered an additional disadvantage in that since a high pressure is introduced from the hydraulic fluid circuit to the pilot port of the logic valves, the high pressure would also be applied to a pilot line and the latter would tend to suffer damage.

SUMMARY OF THE INVENTION

A main object of the invention is to provide a fluid control valve apparatus including logic valve means wherein a pressure in the main port exerts substantially no influences on the movement of the valve body in valve opening and valve closing operation, so that no uncontrolled acceleration and deceleration are caused to occur in the operation of the valve body by a variation in the pressure in the main port.

Another object of the invention is to provide a fluid control valve apparatus including logic valve means wherein the valve has good responsiveness to a signal for opening or closing the valve, and damage to the valve body and production of a surge pressure and a shock which might be caused during its movement in valve closing and opening directions can be minimized.

Still another object of the invention is to provide a fluid control valve apparatus including logic valve means wherein damage to the pilot line difficultly occurs.

According to the invention, there is provided a fluid control valve apparatus comprising logic valve means comprising a valve housing, a first valve chamber defined in the valve housing, a valve body arranged in the first valve chamber for fluidtight movement in an axial direction, with the valve body including opposite end portions and a conical surface portion, and a valve seat adapted to be brought into fluidtight sealing contact with the conical surface portion of the valve body when the valve body moves in a valve closing direction. A first hydraulic fluid chamber and a second hydraulic fluid chamber are defined in the valve housing and are adapted to be brought into communication with each other when the conical surface portion of the valve body is released from contact with the valve seat and brought out of communication with each other when the conical surface portion of the valve body is brought into contact with the valve seat. A first pilot chamber is defined in the valve housing adjacent one end portion of the valve body and is operative to force the valve body to move in the valve closing direction by a first pilot pressure signal received therein. The logic valve means further comprises a second valve chamber defined in the valve housing, a valve body extension formed by extending the other end portion of the valve body through the first hydraulic fluid chamber and arranged in the second valve chamber for fluidtight movement in an axial direction, and a second pilot chamber defined in the valve housing adjacent an end of the valve body extension and operative to force the valve body extension to move in a valve opening direction by a second pilot pressure signal received therein, with the second pilot chamber being independent of the first pilot chamber with respect to hydraulic pressures.

Preferably, the logic valve means comprises damper means located adjacent the end of the valve body extension for abutting engagement with the end immediately before the valve body is brought into contact with the valve seat.

Preferably, the fluid control valve apparatus further comprises a sleeve comprising a sleeve body defining the first valve chamber and a positioning flange located adjacent the first pilot chamber, with the sleeve body being loosely fitted in the valve housing and the flange being fluidtightly arranged in the valve chamber through seal rings interposed between side surfaces of the flange and the valve housing.

Preferably, the valve seat of the logic valve means is in the form of a conical convex surface having a greater vertical angle than the conical surface portion of the valve body, and the difference in vertical angle between them is in a predetermined range.

Preferably, the fluid control valve apparatus further comprises logic valve control means comprising reference pressure setting means for applying a substantially constant reference pressure at all times to the first pilot chamber of the logic valve means as a first pilot pressure signal, and switch means for applying to the second pilot chamber of the logic valve means as a second pilot pressure signal a first predetermined pressure higher than the reference pressure when the valve is to be opened and applying to the second pilot chamber of the logic valve means as a second pilot pressure signal a second predetermined pressure lower than the reference pressure when the valve is to be closed.

Preferably, the switch means comprises a first on-off valve and a second on-off valve comprising high-speed, solenoid-operated on-off valves, and the logic valve control means further comprises pulse producing means providing pulse outputs to electromagnetic means of each of the solenoid-operated on-off valves.

Preferably, the fluid control valve apparatus further comprises logic valve control means comprising first switch means for applying a first predetermined pressure of a relatively high level as a first pilot pressure signal to the first pilot chamber of the logic valve means when the logic valve means is to be closed, and applying a second predetermined pressure of a relatively low level to the first pilot chamber with a slight time lag when the logic valve means is to be opened, and second switch means for applying a third predetermined pressure of a relatively low level to the second pilot chamber of the logic valve means as a second pilot pressure signal when the logic valve means is to be closed and applying a fourth predetermined pressure of a relatively high level to the second pilot chamber when the logic valve means is to be opened.

BRIEF DESCRIPTION OF THE DRAWINGS

FIG. 14 is a time chart showing the timing of signals supplied to the solenoid-operated on-off valves of the control means shown in FIG. 13.

DETAILED DESCRIPTION OF THE PREFERRED EMBODIMENTS

Figures 1, 2, 3:
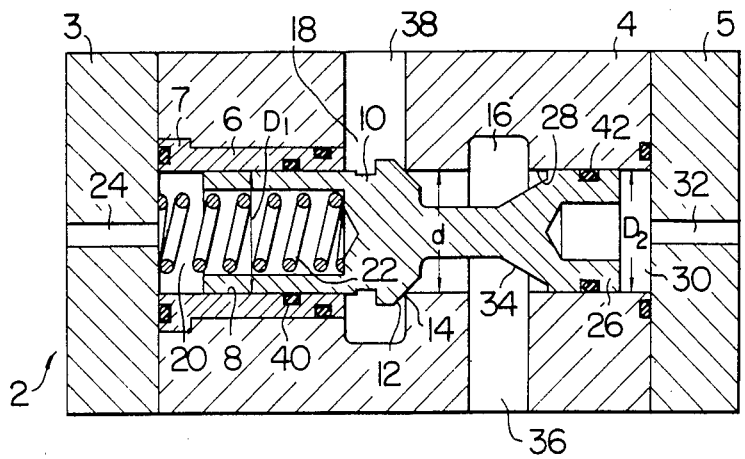
FIG. 1 is a sectional view of a logic valve of the fluid control valve apparatus comprising an embodiment of the invention.
FIG. 2 is a sectional view of a logic valve of the fluid control valve apparatus comprising another embodiment of the present invention.
FIG. 3 is a sectional view of a logic valve of the fluid control valve apparatus comprising still another embodiment of the present invention.

Referring now to the drawings wherein like reference numerals are used throughout the various views to designate like parts and, more particularly, to FIG. 1, according to this figure, a logic valve of the fluid control valve apparatus generally designated by the reference numeral 2, constructed in accordance with the invention comprises a valve housing 4 including end covers 3 and 5, and a sleeve 6 formed with a positioning flange 7 fitted in the valve housing 4 to define a first valve chamber 8 by its inner peripheral surface. A portion of a valve body 10 is arranged in the first valve chamber 8 for liquidtight movement in an axial direction. The valve body 10 is formed with a conical surface portion 12 which is brought into fluidtight contact with a valve seat 14 formed in the valve housing 4. A first hydraulic fluid chamber 16 and a second hydraulic fluid chamber 18 are also defined in the valve housing 4. The first and second hydraulic fluid chambers 16 and 18 are brought into communication with each other when the conical surface portion 12 of the valve body 10 is out of contact with the valve seat 14 and out of communication with each other when the conical surface portion 12 is in contact with the valve seat 14. A pilot chamber 20 is defined between an inner surface of the end cover 3 and one end portion of the valve body 10 and has a spring 22 mounted therein. The pilot chamber 20 has introduced thereto a first pilot pressure signal through a pilot port 24 formed in the end cover 3. The spring 22 and the pilot pressure signal act to force the valve body 10 to move in a valve closing direction.

The valve body 10 extends at the other end portion through the first hydraulic fluid chamber 16 to provide a valve body extension 26 which is arranged for fluidtight movement in an axial direction in a second valve chamber 28 also defined in the valve housing 4. A second pilot chamber 30, independent of the first pilot chamber 20 with respect to hydraulic pressures, is defined between an end of the valve body extension 28 and an inner surface of the end cover 5 and has a second pilot pressure signal introduced thereinto through a second pilot port 32 formed in the end cover 5. The portion of the valve body 10 located in the first hydraulic fluid chamber 16 is formed with a taper 34 to compensate for a force exerted by the hydraulic fluid. The first and second hydraulic fluid chambers 16 and 18 are in communication with first and second main ports 36 and 38 respectively formed in the valve housing 4, and connected with a main hydraulic fluid circuit through the main ports 36 and 38. Seal rings 40 and 42 are mounted in slide portions between the first valve chamber 8 and the valve body 10 and the second valve chamber 28 and the valve body extension 26 respectively to avoid leaks of the fluid.

The valve chambers 8 and 28 and the valve seat 14 have diameters $D_1$, $D_2$ and d, respectively, which have a relation $D_1 = D_2 = d$. Thus, pressures in the first hydraulic fluid chamber 16 and second hydraulic fluid chamber 18 exert no influences on the movement of the valve body, and the movement of the valve body 10 either in the valve opening direction or valve closing direction is decided by the relative magnitudes of the pressure in the first pilot chamber 20, the biasing force of the spring 22 and the pressure in the second pilot chamber 30. That is, when the valve is to be opened, a higher pilot pressure signal is introduced through the second pilot port 32 than through the first pilot port 24 to move the valve body 10 in the valve opening direction to bring the first and second hydraulic fluid chambers 16 and 18 into communication with each other. When the valve is to be closed, a higher pilot pressure signal is introduced through the first pilot port 24 than through the second pilot port 32 to move the valve body 10 in the valve closing direction to bring the conical surface portion 12 into contact with the valve seat 14, to thereby bring the first and second hydraulic fluid chambers 16 and 18 out of communication with each other. A concrete example of logic valve control means for causing the aforesaid operation to be performed is subsequently to be described.

In the above described embodiment, the movement of the valve body 10 is controlled only by pressures in the first and second pilot chambers 20 and 30, and pressures in the first and second hydraulic fluid chambers 16 and 18 are not concerned in the movement of the valve body 10. Thus, by setting the magnitudes of the first and second pilot pressure signals at suitable levels, it is possible to avoid the valve opening speed and valve closing speed becoming too high or too low. By avoiding the valve opening speed and valve closing speed becoming too high or too low, it is possible to improve the responsiveness of the logic valve in a valve opening or closing operation. Also, by avoiding the valve opening speed or valve closing speed becoming too high, it is possible to minimize damage to the valve body and valve seat and occurrences of a surge pressure and a shock applied to the logic valve.

The magnitude of the first pilot pressure signal only has to be such that it is high enough, when the valve is to be closed, to move the valve body 10 against the biasing force of a second pilot pressure signal, and the magnitude of the second pilot pressure signal only has to be such that it is high enough, when the valve is to be opened, to move the valve body 10 against the biasing force of the spring 22. This makes it possible to use a second pilot pressure signal of a small value when the valve is to be closed and to use a first pilot pressure signal of a low value when the valve is to be opened, so that the magnitudes of the pilot pressure signals can be made much lower than when they would have to overcome biasing forces of pressures in the first and second hydraulic fluid chambers 16 and 18 introduced from the pressure in the main hydraulic fluid circuit. Moreover, in the above described embodiment, even if the pilot line suffers damage, the logic valve is prevented from moving to an open position by the action of the spring 22. The taper 34 has the same function as means usually used to compensate for the force of hydraulic pressures in a spool valve and is intended to cancel out, when the valve is to be opened, a force of hydraulic pressure acting on the valve body 10 to move same to a valve opening direction by a flow of working fluid directed from the first hydraulic fluid chamber 16 to the second hydraulic fluid chamber 18.

FIG. 2 shows a logic valve 50 of the fluid control valve apparatus comprising another embodiment. In FIG. 1, due to the fact that $D_2=d$, a seal ring 42 might be damaged by the valve seat 14 and an edge portion of the inlet of the valve chamber 28 when the valve body extension 26 is inserted in the second valve chamber 28 through the valve seat 14 at the time the parts are assembled. To avoid this trouble, the diameter $D_2$ of the second valve chamber 28a is set at a value smaller than that of the diameter d of the valve seat 14a and the valve chamber 28a is formed at its inlet with a conical increased diameter portion 52. This not only enables an avoidance of damage to the seal ring 42a but also allows the extension 26a of the valve body 10a to be freely withdrawn through the valve seat 14a when the parts are disassembled because $D_2<d$, even if the conical surface portion 12a of the valve body 10a strongly strikes the valve seat 14a and the valve seat 14a is bent inwardly. In the embodiment of FIG. 2, $D_1=d$. The valve body 10a is formed, as is the case with the valve body 10 shown in FIG. 1, with a taper 34a to compensate for a force exerted by hydraulic pressures.

Because $D_2<d$, the hydraulic pressure in the first hydraulic fluid chamber 36a applies to the valve body 10a a valve opening force which is proportional to $(d^2-D_2^2)$. To cancel this force out, a rod means 54 is secured to the end cover 3a in a manner so as to extend through the first pilot chamber 20a in an axial direction and be slidably inserted in a piston chamber 56 defined in the valve body 10a, and a pressure regulating chamber 58 separated from the first pilot chamber 20a by the piston 54 with respect to hydraulic pressures is formed in the piston chamber 56 between the end of the piston and the valve body 10a. The pressure regulating chamber 58 is communicated with the first hydraulic fluid chamber 36a through a communicating duct 60. The diameter $D_3$ of the rod means 54 is set at a value satisfying the relation $D_1^2-D_2^2=D_3^2$. By this arrangement, the hydraulic pressure in the first hydraulic fluid chamber 36a is transmitted to the pressure regulating chamber 58 through the duct 60 and a valve closing force proportional to $D_3^2$ is applied to the valve body 10a, to thereby cancel out the aforesaid valve opening force.

In the embodiment of FIG. 2, if the diameter $D_3$ of the rod means 54 is slightly increased over the value that satisfies the relation $D_1^2-D_2^2=D_3^2$, then the force urging the valve body 10a toward the valve seat 14a increases, when the valve is closed, as the hydraulic pressure in the hydraulic fluid chamber 16a rises, so that the conical surface portion 12a is brought into contact with the valve seat 14a with increased fluid-tightness. Thus, the logic valve obtained would be such that even if the hydraulic pressure in the first hydraulic fluid chamber 16a rose, internal leaks of the fluid from the first hydraulic fluid chamber 16a to the second hydraulic fluid would not increase. Similarly, if the diameter $D_1$ of the valve body 10a is made slightly smaller than the diameter d of the valve seat 14a, internal leaks of the fluid from the second hydraulic fluid chamber 18a to the first hydraulic fluid chamber 16a could be reduced when the valve is closed, even if the hydraulic pressure in the second hydraulic fluid chamber 18a rose. By suitably varying the values d, $D_1$, $D_2$ and $D_3$, it is possible to effect adjustments of internal leaks of the fluid and the pilot pressures.

By mounting a restrictor at each of the inlets of the first and second pilot ports 24a and 32a, it is possible to freely adjust the valve opening speed and valve closing speed.

In the logic valve 70 of the fluid control valve apparatus of FIG. 3, the extension 26b of the valve body 10b has a diameter $D_2$ which is set at a level lower than the diameter d of the valve seat 14b, as in the second embodiment shown in FIG. 2. With $D_2<d$, a valve opening force proportional to $(d^2-D_2^2)$ is applied to the valve body 10b by the hydraulic pressure in the first hydraulic fluid chamber 16b. Means provided for cancelling this force out in the embodiment shown in FIG. 3 are distinct from the corresponding means of the embodiment shown in FIG. 2. More specifically, the valve body 10a is formed with a smaller diameter portion 72 of a diameter $D_3$ on the side thereof adjacent the first pilot chamber 20b, to define a pressure regulating chamber 74 between the sleeve 6b and the smaller diameter portion 7a. The pressure regulating chamber 74 is maintained in communication with the first hydraulic fluid chamber 16b through a communicating duct 76 formed in the valve body 10b. The diameter $D_3$ is set at a value equal to the diameter $D_2$ of the extension 26b of the valve body 10b. $D_1=d$ as is the case with other embodiments. Thus, the relation $d^2-D_2^2=D_1^2-D_3^2$ holds, so that cancelling out of the aforesaid biasing force can be effected in like manner.

In the embodiment shown in FIG. 3, if the diameter $D_1$ is made slightly greater than the diameter d, internal leaks of the fluid from the first hydraulic fluid chamber 16b to the second hydraulic fluid chamber 18b could be reduced, and, if the diameter $D_1$ is made smaller than the diameter d, internal leaks of the fluid from the second hydraulic fluid chamber 18b to the first hydraulic fluid chamber 16b could be reduced.

In the embodiments shown in FIGS. 1–3, the spring 22, 22a, 22b is not essential and may be dispensed with.

Figure 4:
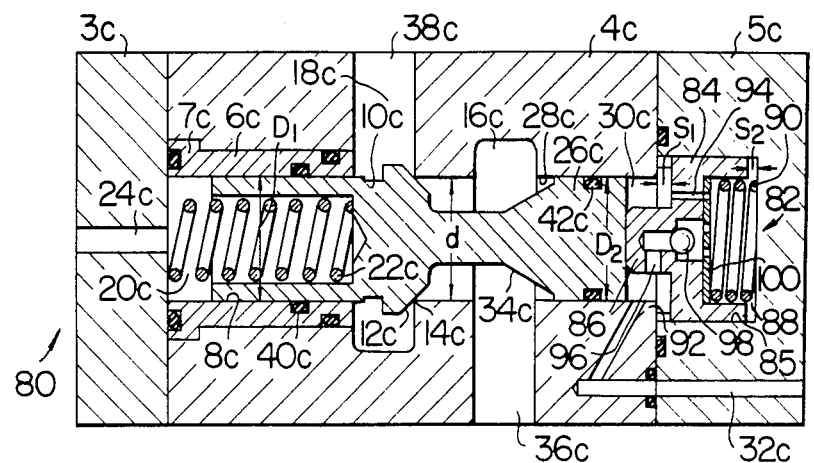
FIG. 4 is a sectional view of a modification of the logic valve shown in FIG. 1 which is provided with damper means.

In logic valve 80 of the fluid control valve apparatus of FIG. 4, which represents a modification of the logic valve 2 shown in FIG. 1, the logic valve 80 is provided with damper means 82 located adjacent an end of the extension 26c of the valve body 10c and adapted to be brought into contact with the end of the extension 26c immediately before the valve body 10c is brought into contact with the valve seat 14c. In other respects, the fluid control valve apparatus is substantially of the same construction as that shown in FIG. 1.

The damper means 82 comprises a damper piston 84 adapted to abut against the end of the extension 26c of the valve body 10c and inserted for movement in an axial direction in a cylinder chamber 85 formed in the end cover 5c and maintained in communication with the second pilot chamber 30c. The damper piston 84 has at one end portion thereof a smaller diameter portion 86 extending into the second pilot chamber 30c and at the other end portion thereof a damper chamber 88 defined between the end thereof and the end cover 5c. Mounted in the damper chamber 88 is a spring 90 which urges by its biasing force the damper portion 84 to move toward the valve body 10c. Formed between the damper piston 84 and a shoulder 92 of the cylinder chamber 85 is a gap $S_1$ which provides a stroke of the damper piston 84. The movement of the damper piston 84 toward the valve body 10c is restricted by the shoulder 92. A gap $S_2$ is formed between the damper piston 84 and the end cover 5c.

The damper piston 84 is formed with an orifice 94 and a large diameter passageway 96 maintaining the damper chamber 88 in communication with the second pilot chamber 30c. A ball check valve 98 is mounted midway in the passageway 96 to block a flow of fluid from the damper chamber 88 to the second pilot chamber 30c and allow the fluid to flow from the second pilot chamber 30c to the damper chamber 88. A disk plate 100 is provided to prevent dislodging of a ball of the ball check valve 98.

Assuming that a pilot pressure signal of a higher pressure is applied to the second pilot port 32c than the first pilot port 24c. Then the valve body 10c is in an open position and the first hydraulic fluid chamber 16c is in communication with the second hydraulic fluid chamber 18c. The damper piston 84 is moved by the biasing force of the spring 90 toward the valve body 10c, to thereby eliminate the gap $S_1$ and maximize the gap $S_2$. If the pilot pressure signal being applied to the second pilot port 32c becomes lower in pressure than the pilot pressure signal being applied to the first pilot port 24c, then the valve body 10c quickly moves toward a closing position, and immediately before being brought into contact with the valve seat 14c, strikes the end of the smaller diameter portion 86 of the damper piston 84 which projects toward the valve body 10c by a distance corresponding to the size of the gap $S_1$ from the position shown in FIG. 4, so that the valve body 10c is brought into contact with the valve seat 14c while pressing against the smaller diameter portion 86 of the damper piston 84.

Operation of the damper piston 84 from the time the valve body 10c strikes the smaller diameter portion 86 of the damper piston until it is brought into contact with the valve seat 14c will be described. The movement of the damper piston 84 is braked by the biasing force of the spring 90 and the resistance offered to the flow of fluid from the damper chamber 88 to the second pilot chamber 30c through the orifice 94. Thus, the valve body 10c moving at high speed, is decelerated after it strikes the smaller diameter portion 86 of the damper piston 84, so that it is moving at low speed when it is brought into contact with the valve seat 14c. Thus, the shock which would otherwise be given to the valve body 10c when it comes into contact with the valve seat 10c can be eliminated and abrupt blocking of communication between the first and second hydraulic fluid chambers 16c and 18c can be avoided, thereby avoiding damage to the conical surface portion 12c of the valve body 10c and preventing occurrences of a shock and a surge pressure.

When the valve apparatus shown in FIG. 4 shifts to a condition in which the pilot pressure signal applied to the second pilot port 34c is higher than that applied to the first pilot port 24c, the valve body 10c immediately moves toward an open position, to bring the first and second hydraulic fluid chambers 16c and 18c into communication with each other. Meanwhile, the movement of the valve body 10c allows the damper piston 84 to be moved by the biasing force of the spring 90 in the same direction as the valve body 10c. At this time, the fluid in the second pilot chamber 30c flows through the passageway 96 quickly into the damper chamber 85 by pushing the ball. Thus, the damper piston 84 moves rapidly toward the valve body 10c to prepare for the next following valve closing operation of the valve body 10c, to enable the damper means 82 perform its function without any trouble even when the valve body 10c is repeatedly actuated in quick succession.

In the embodiment shown in FIG. 4, the valve body 10c is not only moved by the difference in pressure between the pilot chambers on opposite ends thereof but also strikes at its end a damper piston immediately before coming into contact with the valve seat 14c. The provision of the damper means 82 more effectively ensures that the shock, given to the valve body when it comes into contact with the valve seat, is reduced so that damage to the conical surface portion of the valve body 10c can be avoided, and at the same time, rapid blocking of communication between the first and second hydraulic fluid chambers 16c and 18c and occurrences of a shock and a surge pressure can be avoided. The provision of the ball check valve 98 ensures quick restoration of the damper piston 84 to its original position, making it possible to move the valve body 10c repeatedly in quick succession.

As described hereinabove, the logic valve shown in FIG. 4 represents a modification of the logic valve shown in FIG. 1 which is provided with damper means. It will be readily understood that by providing the logic valves shown in FIGS. 2 and 3 with the same damper means as described by referring to FIG. 4, it is possible to achieve the same effects in operation as described by referring to FIG. 4.

Figure 5:
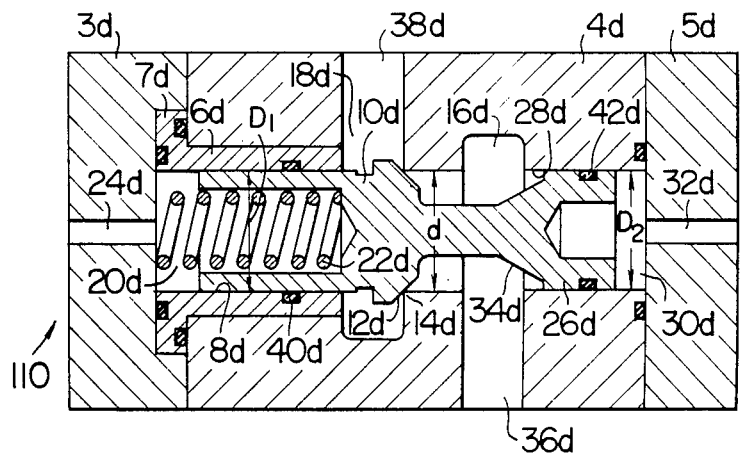
FIG. 5 is a sectional view of a modification of the logic valve shown in FIG. 1, in which the sleeve and seal means of the logic valve are modified.

FIG. 5 shows a logic valve 110 which represents another modification of the logic valve shown in FIG. 1. In the figure, parts similar to those shown in FIG. 1 are designated by like reference characters with a subscript 'd'.

In the embodiment shown in FIG. 1, the first valve chamber 8 is defined by the inner peripheral surface of the sleeve 6 formed with the positioning flange 7. This construction is adopted because it is impossible to insert the valve body 10 in a predetermined position in the valve housing 4 when the parts are assembled if the valve chamber 8 is directly formed in the valve housing 4, since the conical surface portion 12 of the valve body 10 has an outer diameter greater than the inner diameter of the valve chamber 8. In FIG. 1, a seal ring (O-ring) is mounted between the sleeve and an inner wall surface of the valve housing 4 to avoid a flow of fluid between the first pilot chamber 20 and second hydraulic fluid chamber 18 and an outflow of fluid from these chambers to outside, and a tiny gap between the sleeve and a valve housing is utilized to absorb misalignment of the center axis of the valve body 10 with the center of the valve seat 14. However, in actual practice, when pressure differential is produced between the first and second hydraulic fluid chambers 16 and 18, an unbalancing force oriented in a direction perpendicular to the axial direction of the sleeve 6 might be produced due to the fact that deformation of the seal ring is not uniform on the entire outer peripheral rusface of the sleeve 6, with a result that the center axis of the sleeve 6 might be brought out of alignment with the center of the valve seat 14. This might prevent the conical surface portion 12 of the valve body 10 from coming into fluidtight contact with the valve seat 14, causing internal leaks of fluid to occur between the two hydraulic fluid chambers 16 and 18.

Figure 6:
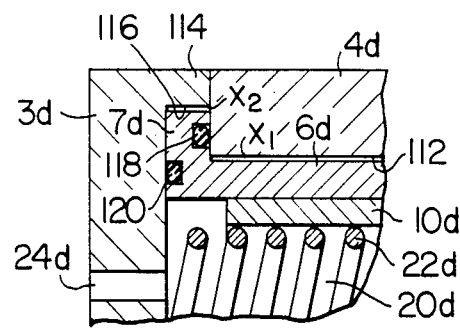
FIG. 6 is a view, on an enlarged scale, of the flange of the sleeve of the logic valve shown in FIG. 5 and its surroundings.

The modification shown in FIG. 5 provides improvements in the logic valve to avoid the aforesaid disadvantage. As shown in FIG. 6, the sleeve 6d provided with the positioning sleeve 7d is loosely inserted in the valve housing 4d with a suitable clearance. More specifically, the sleeve 6d formed with the flange 7d of an annular shape is loosely inserted in the valve housing 4d in such a manner that gaps $X_1$ and $X_2$ are formed between them and inner wall surfaces 112, 116 of the valve housing 4d and a stepped portion 114 formed in the end cover 3d, respectively. The gaps $X_1$ and $X_2$ are such that misalignment of center axes produced between the valve body 10d, sleeve 6d and various chambers defined in the valve housing 4d when the parts are assembled can be accommodated. Seal rings 118 and 120 are mounted between opposite side surfaces of the flange 7d and the end surface of the valve housing 4d and the inner wall surface of the end cover 3d, respectively, to provide seals therebetween. This offers the following advantage. If the center axis of the valve body 10d is out of alignment with the center of the valve seat 14d, a force tending to bring the center axis of the valve body 10d into alignment with the center of the valve seat 14d is then exerted by a contact surface portion of the valve seat 14d to the main body of the valve body 10d at a time when the conical surface portion 12d is brought into contact with the valve seat 14d, so that this force moves the valve body 10d and sleeve 6d radially in the range limited by the gaps $X_1$ and $X_2$. As a result, the center axis of the valve body 10d is brought into alignment with the center of the valve seat 14d, thereby bringing the conical surface portion 12d into fluidtight contact with the valve seat 14d. Since no seals are provided to the outer peripheral surface of the sleeve 6d and flange 7d, the pressure in the second hydraulic fluid chamber 18d is uniformly applied to the outer peripheral surface of the sleeve 6d through the gaps $X_1$ and $X_2$, to enable the sleeve 6d to move smoothly in the radial direction. The seals 118 and 120 are located in the axial direction of the sleeve 6d, so that they exert no influences on the movement of the sleeve 6d in the radial direction. The seals 118 and 120 perform the function of avoiding leaks of fluid between the second hydraulic fluid chamber 18d and first pilot chamber 20d and from the second hydraulic fluid chamber 18d and second pilot chamber 20d to outside.

In the embodiment shown in FIGS. 5 and 6, means are provided for uniformly applying pressure to the outer peripheral surface of the sleeve 6d, and the seal rings 118 and 120 are mounted on the flange 7d of the sleeve 6d without mounting them on the outer peripheral surface of the sleeve 6d. By this feature, it is possible to bring the conical surface portion 12d of the valve body 10d into fluidtight contact with the valve seat 14d even if the center axis of the valve body 10d is out of alignment with the center of the valve seat 10d when the parts are fabricated or assembled, thereby enabling leaks of the fluid to be positively avoided. The provision of the seal rings to the flange 7d of the sleeve 6d enables leaks of the fluid from the first pilot chamber 20d and second hydraulic fluid chamber 18d to outside to be avoided. The arrangement whereby the sleeve 6d formed with the flange 7d is loosely fitted in the valve housing 4d with suitable gaps $X_1$ and $X_2$ for accommodating misalignment produced when the parts are fabricated or assembled facilitates fabrication of the valve chamber, valve body and sleeve, as an additional advantage offered by the invention.

In the above-described embodiment of FIG. 5, the seal rings 40d and 42d are preferably in the form of piston rings to render their deformation uniform through the entire circumference with the pressure in the second hydraulic fluid chamber 18d is applied to the valve body 10d, to thereby minimize influences exerted on the valve body 10d.

The logic valve 110 shown in FIGS. 5 and 6 represents a modification of the logic valve shown in FIG. 1. It will be appreciated that when a similar modification is made to the logic valves 50, 70, 80 shown in FIGS. 2–4, similar results can be achieved.

Figure 7:
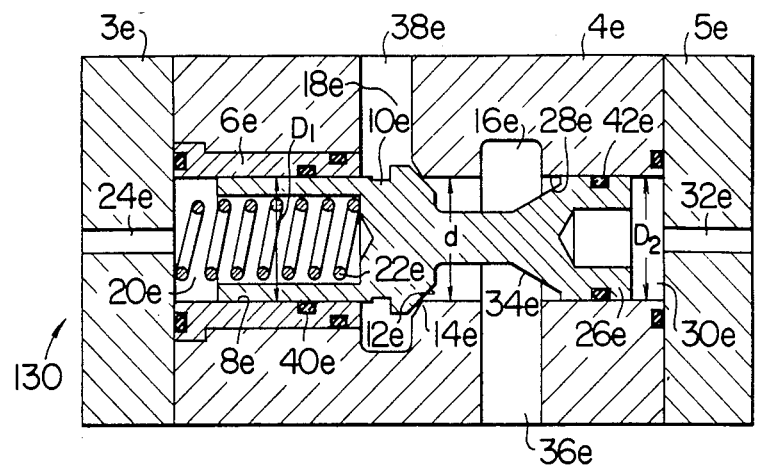
FIG. 7 is a sectional view of a modification of the logic valve shown in FIG. 1 in which the valve seat is modified.

FIG. 7 shows a logic valve 130 representing a further modification of the logic valve 2 shown in FIG. 1.

In FIG. 7, the valve seat 14e is constituted by a conical convex surface 132 of a larger vertical angle than the conical surface portion 12e of the valve body 10e.

Figure 8:
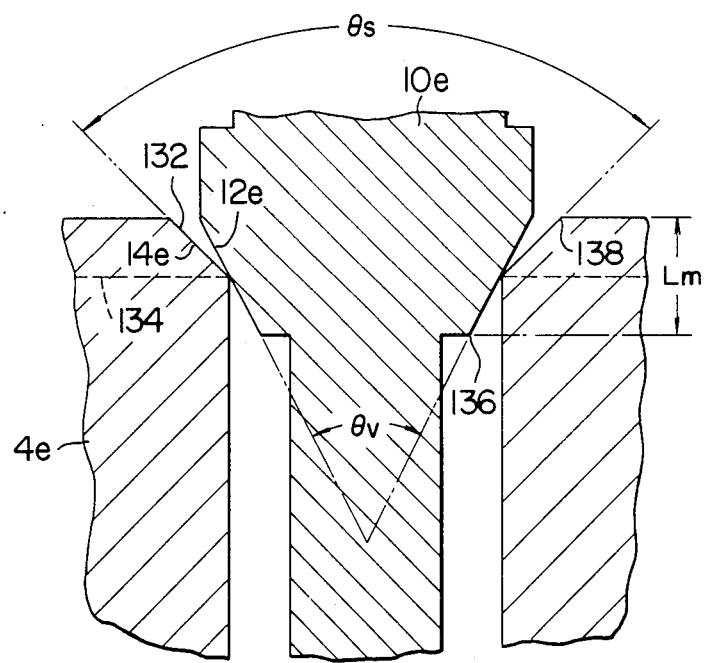
FIG. 8 is a view, on an enlarged scale, of the conical surface portion of the valve body and the valve seat portion shown in FIG. 7.

FIG. 8 shows on an enlarged scale the valve body 10e and valve seat 14e shown in FIG. 7. In FIG. 8, the conical surface portion 12e is shown as being brought into contact with the valve seat 14e following movement of the valve body 10e caused by the pressure in the first pilot chamber 20e. In the logic valve 130, the following relation holds:

$$\theta_s < \theta_v,$$

where $\theta_s$ is the vertical angle of the cone of the conical convex surface 132 of the valve seat 14e and $\theta_v$ is the vertical angle of the cone of the conical surface portion 12e of the vlve body 10e.

When the valve seat 14e is constituted by the conical convex surface 132 as shown in FIGS. 7 and 8, it will be apparent that when the valve body 14e is released from engagement with the valve seat 14e, the rate of a change in the area of a channel defined by the conical surface portion 12e of the valve body 10e and the valve seat 14e is very small as compared with the rate of a change in the shape of the valve seat 14e as indicated by a dotted line 134 in FIG. 8. That is, when the spacing between one end 136 of the conical surface portion 12e of the valve body 10e and one end 138 of the conical convex surface 132 of the valve seat 14e is denoted by $L_m$, a metering region is provided while the displacement of the valve body 10e is within the spacing $L_m$, so that it is possible to reduce the rate of a change in the area of the channel. The same is true of a movement of the valve body 10e in the opposite direction.

Thus, the flow rate of the working fluid would not be greatly increased or decreased by a slight displacement of the valve body 10e in a valve opening or closing operation. Combined with the setting of the valve opening and valve closing speeds of the valve body 10e at optimum values as described hereinabove, this enables a sudden change in the output of the logic valve to be further effectively avoided.

The closer to each other the values of the vertical angles $\theta_s$ and $\theta_v$ become, the more intimate becomes the contact between the valve body 10e and valve seat 14e to a surface contact, and the diameter d of the valve seat 14e shown in FIG. 7 becomes indefinite, thereby causing the risk of the valve becoming unbalanced. Conversely, when the difference between the vertical angles $\theta_s$ and $\theta_v$ becomes greater in value, the rate of an increase in the area of a channel with respect to a displacement of the valve body 10e becomes higher in value, causing it impossible to achieve the desired effects.

Experiments were conducted to obtain suitable values of the vertical angles $\theta_s$ and $\theta_v$. Results obtained show that the desired results can be obtained when the values of the vertical angles $\theta_s$ and $\theta_v$ are set in the following ranges:

$\theta_v = 90$ degrees,
$\theta_s - \theta_v = 10$ to 40 degrees.

In the embodiment shown in FIGS. 7 and 8, means are provided for moving the valve body 104 only by the pressures on opposite ends of the valve body and the valve seat 14e is formed with a conical convex surface 132. By this feature, it is possible to more effectively avoid a sudden change in the output of the logic valve and prevent occurrences of a shock and surge pressure, and to facilitate control of the flow rate of a fluid flowing through the logic valve. Additionally the formation of the conical convex surface in the valve seat gives to the valve a self-aligning function and a wedging function, thereby enabling alignment of the valve body with the valve seat to be readily obtained.

The logic valve shown in FIGS. 7 and 8 represents a modification of the logic valve shown in FIG. 1. It will be appeciated that by similarly modifying the logic valves shown in FIGS. 2-6, similar results can be obtained in the effects achieved by the modification.

Figure 9:
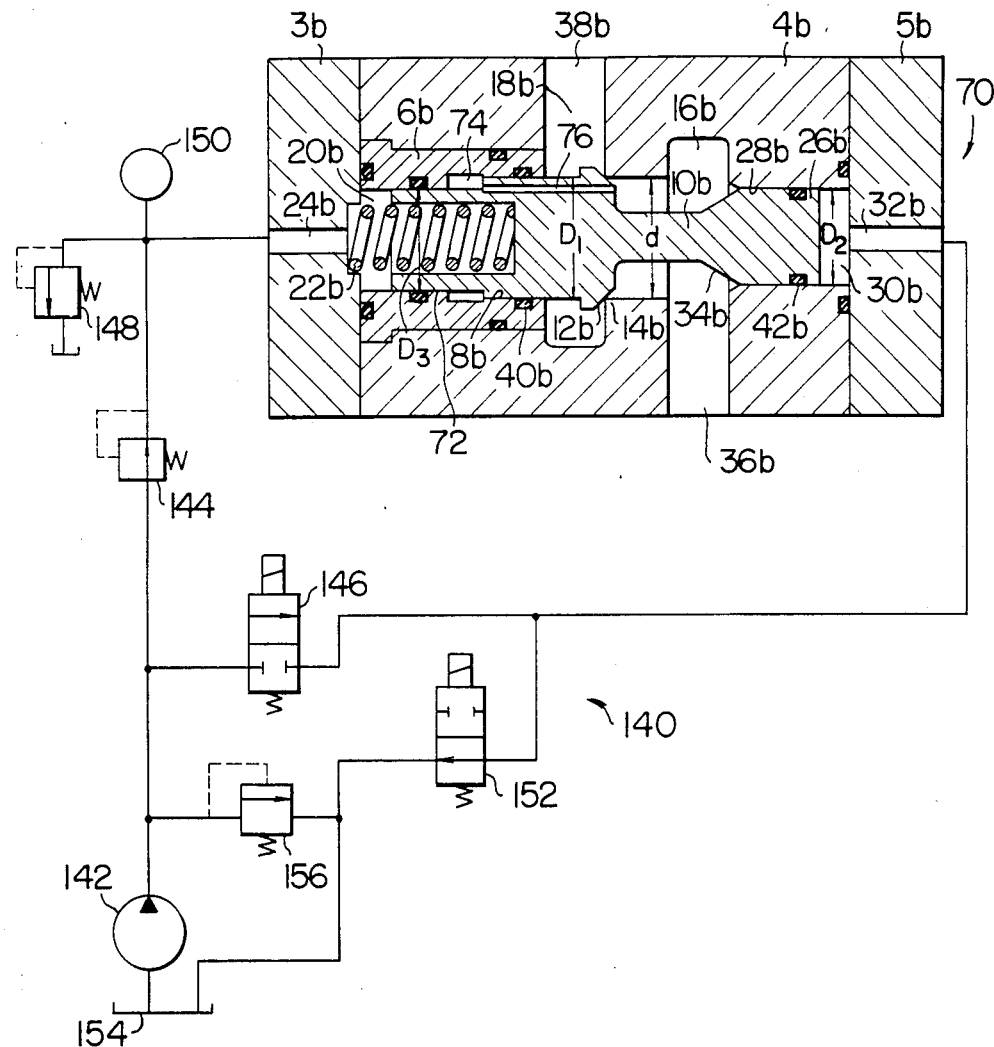
FIG. 9 is a circuit diagram showing one example of the logic valve control means of the fluid control valve apparatus according to the invention, showing the logic valve control means in combination with the logic valve shown in FIG. 3.

FIG. 9 shows one example of logic valve control means for controlling the operation of a logic valve of the fluid control valve apparatus according to the invention by supplying first and second pilot pressure signals to the first and second pilot chambers in predetermined modes of operation. The logic valve control means generally designated by the reference numeral 140 is provided to the logic valve 70 shown in FIG. 3.

The control means 140 comprises a pilot pump 142 connected at its discharge side to the first pilot port 24b of the logic valve 70 through a pressure reducing valve 144 and to the second pilot port 32b through a solenoid-operated, on-off valve 146. The first pilot port 24b has connected thereto a relief valve 148 set at a pressure level higher than the pressure level at which the pressure reducing valve 144 is set and an accumulator 150 to prevent sudden confinement of hydraulic fluid that might otherwise occur due to a delay in the response of the operations of the pressure reducing valve 144 and relief valve 148. The relief valve 148 and accumulator 150 are connected in parallel with the pressure reducing valve 144. A reservoir 154 is connected to the second pilot port 32b through a solenoid-operated, on-off valve 152 in parallel with the pump 142. A relief valve 156 is intended to maintain the second pilot pressure signal supplied to the second pilot port 32b at a predetermined high pressure level when the valve is opened. The pressure reducing valve 144 is set at a pressure level lower than the pressure level at which the relief valve 156 is set or about one-half the pressure level of the relief valve 156, for example. The pressure reducing valve 144 constitute reference pressure setting means and solenoid-operated, on-off valves 146 and 152 constitute switch means.

In operation, the discharge pressure of the pilot pump 142 is reduced by the pressure reducing valve 144 to a predetermined value and supplied at all times as a first pilot pressure signal having a reference pressure level to the first pilot chamber 20b through the first pilot port 24b. When the valve is closed, the solenoid-operated, on-off valves 146 and 152 are not energized with the valve 146 open and the valve 152 closed. This allows the second pilot chamber 30b to communicate with the reservoir 154 through the valve 152 so that the pressure in the pilot chamber 30b is at the reservoir pressure level (zero or substantially zero). Thus, when a biasing force which represents the pressure in the first pilot chamber $20b \times \pi/4 \cdot D_3^2$ is applied to the valve body 10b along with the biasing force of the spring 22b, the valve body 10b is moved in a valve closing direction and the conical surface portion 12b is brought into contact with the valve seat 14b while the first and second hydraulic fluid chambers 16b and 18b are brought out of communication with each other.

When the valve is to be opened, the solenoid-operated, on-off valves are simultaneously energized, so that the valve 146 is opened and the valve 152 is closed. This causes the discharge pressure of the pilot pump 142 to be supplied as a second pilot pressure signal to the second pilot chamber 30b through the valve 146. This makes the pressure in the pilot chamber 30b become equal to the pressure at which the relief valve 156 is set. This pressure is higher than the pressure (reference pressure) in the first pilot chamber 20b, so that the difference in pressure between the two pilot chambers 20b and 30b produces a biasing force urging the valve body 10b to move in a valve opening direction against the biasing force of the spring 22b. Thus, the conical surface portion 12b is released from engagement with the valve seat 14b and the first and second hydraulic fluid chambers 16b and 18b are brought into communication with each other.

When the logic valve is switched from the open position to the closed position, the solenoid-operated, on-off valves 146 and 152 are switched from an energized condition to a non-energized condition so that the valve 146 is closed and the valve 152 is opened. This reduces the pressure in the second pilot chamber 30b to the reservoir pressure level. As a result, the valve body 10b is moved by the biasing force representing the pressure differential between the two pilot chambers 20b and 30b and the biasing force of the spring 22b in a valve closing direction.

As described hereinabove, when the valve body 10b moves in the valve opening and valve closing directions, no influences are exerted on the movement of the valve body 10b by the pressures in the first and second hydraulic fluid chambers 16b and 18b. Thus, by setting the size (reference pressure) of the first pilot pressure signal supplied to the first pilot chamber 20b or the pressure at which the pressure reducing valve 144 is set and the size of the second pilot pressure signal supplied to the second pilot chamber 30b or the pressure at which the relief valve 156 is set at suitable values respectively, it is possible to regulate the speeds of movement of the valve body 10b during its valve closing and valve opening operations to desired values.

Preferably, the pressure at which the pressure reducing valve 144 is set is about one-half the pressure at which the relief valve 156 is set. By this arrangement, it is possible to set the difference in pressure between the first and second pilot chambers 20b and 30b at the same value both for the valve opening operation and valve closing operation and make the speeds of movement of the valve body 10b become substantially equal to each other for performing the valve opening operation and valve closing operation. However, the invention is not limited to these values.

In the logic valve shown in FIG. 9, the logic valve 70 shown in FIG. 3 is provided with control means 140. It will be apparent that similar results can be achieved when the same control means as the control means 140 is incorporated in the logic valves shown in FIGS. 1–8.

Figure 10:
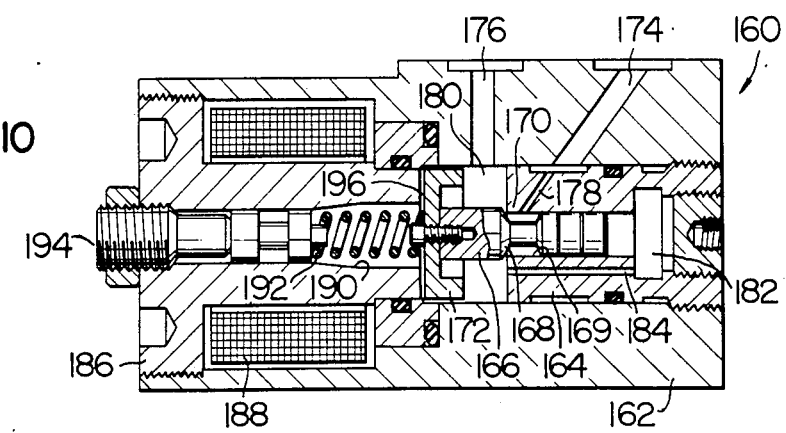
FIG. 10 is a sectional view of a high-speed, solenoid-operated on-off valve suitable for use as switch means of the logic valve control means of the fluid control valve apparatus according to the invention.
Figure 11:
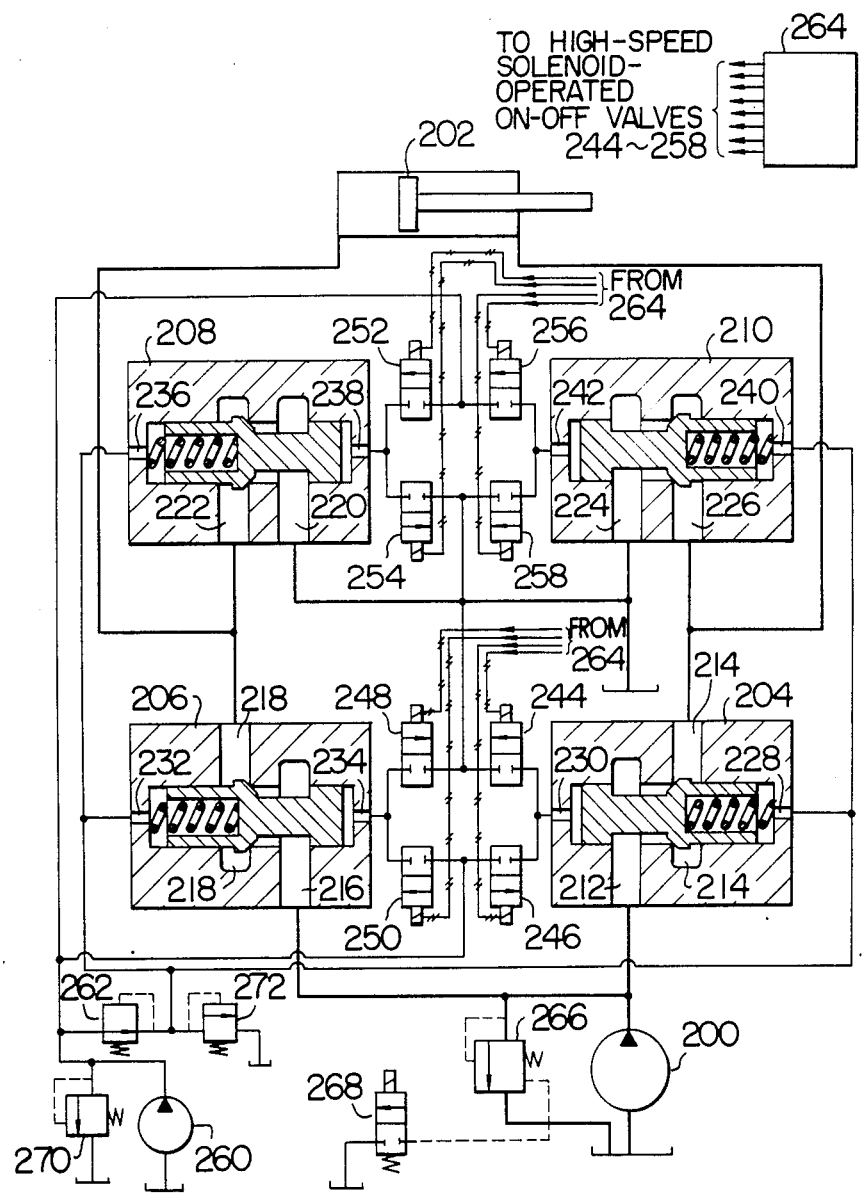
FIG. 11 is a circuit diagram showing one example of the control means for four logic valves connected to a hydraulic fluid circuit comprising the logic valve control means shown in FIG. 9 as a basic component and using the high-speed, solenoid-operated on-off valves shown in FIG. 10 as switch means.
Figure 12:
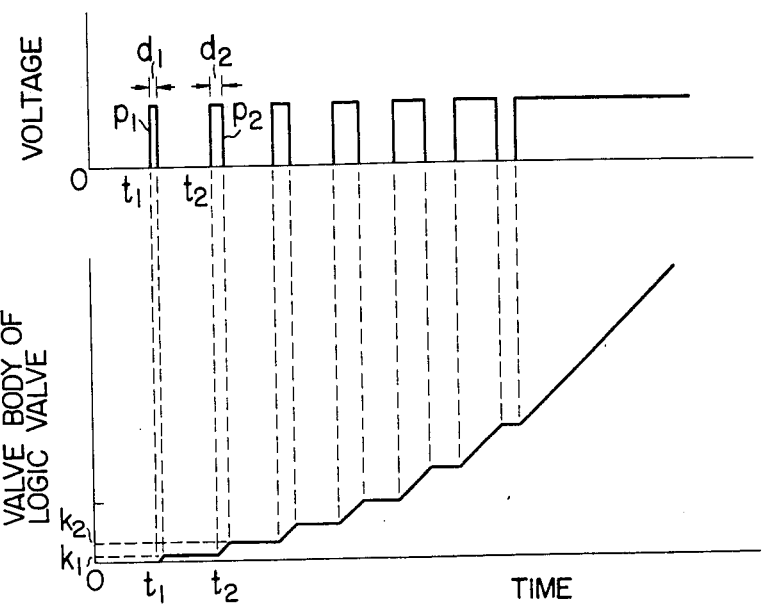
FIG. 12 is a graphical illustration of a magnitude of displacement (a) of the valve body in relation to the duration of a pulse (b) supplied to one logic valve in the control means shown in FIG. 11.

Referring to FIGS. 10–12, the fluid control valve apparatus comprising the logic valve control means shown in FIG. 9 is used for controlling the supply of hydraulic fluid to a hydraulic actuator through a hydraulic fluid circuit including a hydraulic pump in addition to the hydraulic actuator, to enable control of the logic valves to be effected synchronously and permit control of the flow rate and pressure of the hydraulic fluid supplied to the hydraulic actuator to be also effected.

First, a high-speed, solenoid-operated on-off valve used with the logic valve control means generally designated by the reference numeral 160 will be described by referring to FIG. 10. The valve 160 includes a body 162 having a sleeve 164 fitted therein for receiving a valve body 166 for movement rightwardly and leftwardly in the figure. The valve body 166 is formed with a conical surface portion 168 which is brought into and out of contact with a valve seat 170 constituted by an inner peripheral edge of a bore 169 of the sleeve 164 for receiving the valve body, to allow a fluid to flow therethrough or cut off its supply. An armature 172 is secured to a left end of the valve body 166. The body 162 is formed with a first port 174 and a second port 176, the first port 174 being connected to a pilot pressure source or a reservoir and the second port 176 being connected to the second pilot port of a logic valve. The first and second ports 174 and 176 are maintained in communication with each other through a passageway 178, a passageway constituted by a portion 169 of an opening of the sleeve 164 in which the valve body 166 is received, the conical surface portion 168 and the valve seat 170, and a chamber 180. A chamber 182 is communicated with the chamber 180 through a direct communication duct 184 to achieve balancing of the pressures in the two chambers 180 and 182.

The body 162 has a core 186 mounted thereon in a position facing the armature 172, with the core 186, having a coil 188 wound thereon. The core 186 is formed at its center with an opening 190 which has mounted therein a spring 192 for pressing against the armature 172. The spring 192 has its biasing force adjusted by an adjusting screw 194. A gap 196 is formed between an end of the core 186 and the armature 172. The armature 172, core 186, coil 188, spring 192, adjusting screw 194 and gap 196 constitute electromagnetic means.

When no voltage is applied to the coil 188, the armature 172 is forced by the biasing force of the spring 192 to move rightwardly in FIG. 10. This moves the valve body 166 rightwardly to bring its conical surface portion 168 into contact with the valve seat 170, so that communication between the first port 174 and second port 176 is interrupted. If a voltage is impressed on the coil 188, then the armature 172 is attracted to the core 186 and moves leftwardly for a distance corresponding to the size of the gap 196. As a result, the valve body 166 moves leftwardly and its conical surface portion 168 is brought out of contact with the valve seat 170. This brings the first and second ports 174 and 176 into communication with each other, to allow a predetermined amount of fluid which is decided by the area of a channel defined by the valve seat 170 and the conical surface portion 168 to flow between the first and second ports 174 and 176. The solenoid-operated on-off valve of the aforesaid construction includes the valve body 166 and conical surface portion 168 and is of a poppet type. Thus, the valve has a small valve stroke and high responsiveness, thereby enabling valve opening and valve closing operations to be performed repeatedly in quick succession. This makes the valve shown in FIG. 10 perform valve opening and valve closing operations fifty to one hundred times per second as constructed with solenoid-operated on-off valves of the prior art which performs an operation only once per second.

FIG. 11 shows an embodiment of the fluid control valve apparatus for a hydraulic fluid circuit constructed by using the high-speed, solenoid-operated on-off valve shown in FIG. 10 as the logic valve control means shown in FIG. 9. The hydraulic fluid circuit includes a hydraulic pump 200 for hydraulically driving a hydraulic cylinder 202. Four logic valves 204, 206, 208 and 210 are mounted between the hydraulic pump 200 and hydraulic cylinder 202 to effect control of a supply of hydraulic fluid to the hydraulic cylinder 202. The logic valves 204 and 208 form a pair for operation, and the logic valves 206 and 210 form another pair for operation. The logic valves 204, 206, 208 and 210 which are of substantially the same construction as the logic valve 2 shown in FIG. 1 are formed with first and second ports 212 and 214, 216 and 218, 220 and 222 and 224 and 226, respectively, which correspond to the main ports 36 and 38 of the logic valve 2 shown in FIG. 1, and with first and second pilot ports 228 and 230, 232 and 234, 236 and 238 and 240 and 242, respectively, which correspond to the first and second pilot ports 24 and 32 of the logic valve 2 shown in FIG. 1. The logic valves 204, 206, 208 and 210 have their operations controlled by the high-speed, solenoid-operated on-off valves 244 and 246, 248 and 250, 252 and 254 and 256 and 258, respectively. The high-speed, solenoid-operated on-off valves 244, 246, 248, 250, 252, 254, 256 and 258 are all of the same construction as the high-speed, solenoid-operated on-off valve 160 shown in FIG. 10.

A pilot pump 260 produces a pilot pressure which is supplied through a pressure-reducing valve 262 to the first pilot ports 228, 232, 236 and 240 of the logic valves 204, 206, 208 and 210, respectively, and to one port of each of the high-speed, solenoid-operated on-off valves 246, 250, 252 and 256. One port of each of the high-speed, solenoid-operated on-off valves 244, 248, 254 and 258 is connected to a reservoir. The other port of each of the high-speed valves 244–258 is connected to the second pilot ports 230, 234, 238 and 242 of the corresponding logic valves. The first main ports 212 and 216 of the logic valves 204 and 206 are connected to the hydraulic pump 200, and the first main ports 220 and 224 of the logic valves 208 and 210 are connected to the reservoir, with the second main ports 214 and 218 of the logic valves 204 and 206 being connected to a rod-side chamber of the hydraulic cylinder 202, and the second main ports 222 and 226 of the logic valves 208 and 210 being connected to a head-side chamber of the hydraulic cylinder 202. The coils of the high-speed, solenoid-operated on-off valves 244–259 each receive a pulse supply from pulse producing means 264. The armature of each of the high-speed, solenoid-operated on-off valves is attracted to the coil when a supply of pulse is received thereby to open the on-off valves. The pulse producing means 264 is provided with means for modulating the pulse duration of pulses produced thereby.

An unloading relief valve 266, a solenoid-operated on-off valve 268, a relief valve 270 for setting the pressure level at which a pilot pressure is supplied, and a relief valve 272 for preventing a rise in the value of the reference pilot pressure are provided. As described above in connection with FIG. 9, the pressure reducing valve 262 is set at a pressure level lower than the pressure level at which the relief valve 270 is set, and the relief valve 272 is set at a pressure level slightly higher than the pressure level at which the pressure reducing valve 262 is set.

Operation of the fluid control valve apparatus of the aforesaid construction will be described by referring to a graph of FIG. 12 showing the magnitude of displacements of the valve bodies of the logic valves in relation to the pulse duration. When it is desired to drive the hydraulic cylinder 202 to move its rod out of the cylinder, the high-speed, solenoid-operated on-off valves 250 and 256 are energized with a predetermined timing by pulses supplied from the pulse producing means 264. The timing is that of the pulses produced by the pulse producing means 264, so that energization of the valves 250 and 256 can be achieved quite radially with a good timing. As shown in FIG. 10, the valve body 166 of the solenoid-operated on-off valves 250 and 256 moves leftwardly only during the time pulses are impressed on the coils 188, to thereby open the valve. Upon the on-off valves 250 and 256 being opened, a supply of fluid from the pilot pump 260 flows through the on-off valves 250 and 256 to the second pilot ports 234 and 242 of the logic valves 206 and 210, to thereby cause the valve bodies of the logic valves 206 and 210 to be displaced by a magnitude corresponding to the amount of the fluid supplied to the second pilot ports and open the logic valves. Thus, the degree of opening of the logic valves 206 and 210 corresponds to the pulse duration of the pulses supplied to the on-off valves 250 and 256. A supply of fluid from the hydraulic pump 200 flows through the first and second main ports 216 and 218 of the logic valve 206 to the head-side chamber of the hydraulic cylinder 202, while the fluid in the rod-side chamber of the hydraulic cylinder 202 is discharged therefrom through the first and second main ports 224 and 226 of the logic valve 210 into the reservoir. In this case, the supply of fluid flowing to the head-side chamber of the hydraulic cylinder 202 has a flow rate which is commensurate with the degree of opening of the logic valve 206, and the hydraulic cylinder 202 is driven to extend its rod out of the cylinder at a speed commensurate with the flow rate. It will be appreciated that by applying a pulse current of a predetermined pulse duration to a high-speed, solenoid-operated on-off valve, it is possible to effect control of flow rate by a logic valve. To close the logic valves 206 and 210, one only has to energize the high-speed, solenoid-operated on-off valves 248 and 258 to connect the second pilot ports 234 and 242 of the logic valves 206 and 210 to the reservoir.

When it is desired to drive the hydraulic cylinder 202 to move its rod into the cylinder, the hydraulic cylinder 202 can be driven by performing the same operation as described hereinabove in which the high-speed, solenoid-operated on-off valves 246 and 252 are energized and the logic valves 204 and 208 are opened to a predetermined degree of opening.

One process of obtaining a predetermined magnitude of displacement of a valve body in a logic valve will be described. Assuming that a pulse $p_1$ of a pulse duration $d_1$ is produced at a time $t_1$ as shown in FIG. 12(a) from the pulse producing means 264 and applied to the coil 188 of the high-speed, solenoid-operated on-off valve, then the high-speed, solenoid-operated on-off valve is immediately opened and allows the fluid supplied by the pilot pump 260 to flow to the second pilot port of the logic valve in a quantity which is regulated by the area of a channel defined by the conical surface portion 168 and the valve seat 170 per unit time. The quantity of the fluid flowing to the second pilot port is proportional to the pulse duration $d_1$. When the fluid is supplied to the second pilot port, the valve body of the logic valve is displaced in a valve opening direction by a magnitude $k_1$ to open the logic valve, as shown in FIG. 12(b). An inclination representing shifting of the valve body from zero displacement to $k_1$ displacement shown in FIG. 12(b) is proportional to a flow rate of a fluid per unit time achieved when the high-speed, solenoid-operated on-off valve is opened. Following lapse of the time corresponding to the pulse duration $d_1$, the pulse voltage impressed on the coil by the pulse $p_1$ is removed and the high-speed, solenoid-operated on-off valve is immediately closed, while the valve body of the logic valve is maintained in the condition of $k_1$ displacement. Then, at a time $t_2$, a pulse $p_2$ of a pulse duration $d_2$ is applied to the coil 188. This causes the valve body of the logic valve to be displaced by a magnitude proportional to the pulse duration $d_2$ to achieve a $k_2$ displacement. In this case, an inclination angle from $k_1$ displacement to $k_2$ displacement is equal to an inclination angle from zero displacement to $k_1$ displacement. By applying pulses successively to the coil 188 of the high-speed, solenoid-operated on-off valve in the manner described hereinabove, it is possible to obtain a stepwise displacement of the valve body of the logic valve until the displacement reaches a predetermined magnitude. By virtue of the stepwise displacement, it is possible to obtain a minuscule displacement of the valve body of a logic valve which essentially has a small stroke. The valve opening speed of the valve body of a logic valve may vary depending on a mean changing rate of the stepwise displacement of the valve body. Thus, the magnitude of displacement of the valve body (degree of valve opening) and the valve opening speed can be freely regulated by adjusting the pulse duration of pulses applied to the high-speed, solenoid-operated on-off valve. As described hereinabove, the high-speed, solenoid-operated on-off valve has a very high responsiveness and is capable of following up continuous application of pulses in quick succession.

In the fluid control valve apparatus described hereinabove, the logic valves each operated only by pilot pressures are connected to high-speed, solenoid-operated on-off valves and a pulse of a modulated pulse width is applied to each of the on-off valves from pulse voltage output means. Thus, it is possible to freely control the operation speed and the degree of opening of the logical valves by merely effecting pulse moduration in a simple combination of the logic valves and the high-speed, solenoid-operated on-off valves, to thereby effect control of the pressure of fluid, the flow rate of fluid and synchronization of the valves. Also it is possible to effectively control a mean operation speed of the logical valves during a valve opening or valve closing operation, thereby enabling an improved transitory responsiveness. Moreover, by arranging the high-speed, solenoid-operated on-off valves and the logic valves as a unitary structure or close to each other, it is possible to greatly reduce the length of pilot lines. A logic circuit which is very complex in construction can be simplified by using an electric circuit. Combined with the aforesaid reduction in the length of the pilot lines, it is possible to realize an overall compact size in a fluid control valve apparatus which is also easy to maintain.

In the description of the embodiment of the fluid control valve apparatus shown in FIG. 11, the magnitude of a displacement of a valve body of a logic valve has been described as being adjusted by a modulation of the pulse duration of a pulse. It is to be understood, however, that the invention is not limited to the use of a pulse duration modulation for this purpose and that adjustments of a displacement magnitude can be effected by rendering a pulse either fine or coarse by varying the frequencies of pulses of the same pulse duration. What is essential is that a pulse output used in the invention is such that it enables a predetermined mean voltage to be obtained in a predetermined period of time.

Figure 13:
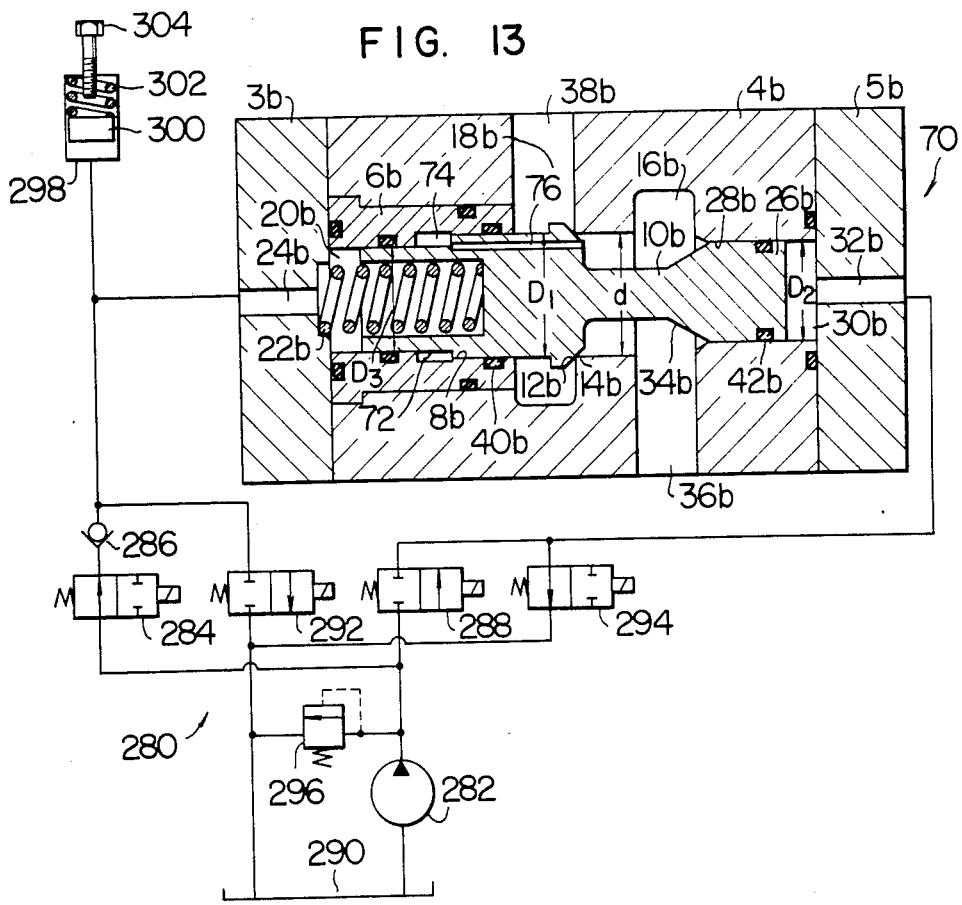
FIG. 13 is a circuit diagram showing another example of the logic valve control means of the fluid control valve apparatus according to the invention, showing the logic valve control means in combination with the logic valve shown in FIG. 3.

FIG. 13 shows another example of a logic valve control means 280 which is shown as forming a combination with the logic valve 70 shown in FIG. 3.

As shown, the logic valve control means 280 comprises a pilot pump 282 connected on its discharge side to the first pilot port 24b of the logic valve 70 through a solenoid-operated on-off valve 284 and a check valve 286 and to the second pilot port 32b thereof through a solenoid-operated on-off valve 288. A reservoir 290 is connected to the first pilot port 24b through a solenoid-operated on-off valve 292 and to the second pilot port 32b through a solenoid-operated on-off valve 294 in parallel with the pilot pump 282. Mounted between the pump 282 and the reservoir 290 is a relief valve 296 which is set at a pressure level equal to a pilot pressure signal of a high pressure level. An accumulator 298 is connected to the first pilot port 24b in parallel with the valves 284 and 292 for receiving a working fluid discharged through the pilot port 24b of the logic valve 70 when the latter is half opened. The degree of opening of the logic valve when it is opened may vary depending on the volume of the accumulator 298. The accumulator 298 comprises a piston 300, a spring 302 and a set screw 304 and can have its volume adjusted. The solenoid-operated on-off valves 284 and 292 constitute first switch means and solenoid-operated on-off valves 288 and 294 constitute second switch means.

In operation, when the valve is closed, all the solenoid-operated on-off valves 284, 288, 292 and 294 are de-energized. This opens the on-off valves 284 and 294 and closes the on-off valves 288 and 292, so that a pilot pressure signal of high pressure level is supplied from the pilot pump 282 to the first pilot port 24b through the on-off valve 284 and the second pilot port 32b is connected to the reservoir 290 through the on-off valve 294. Thus, the valve body 10b is urged to move in a valve closing direction, so that its conical surface portion 12b is brought into contact with the valve seat 14b and the first and second hydraulic fluid chambers 16b and 18b are brought out of communication with each other.

When the valve is to be opened, the solenoid-operated on-off valves 284, 288, 292 and 294 are energized under sequence control as shown in FIG. 14, so that the valve opening shifts to a full-open position through a half-open position. More specifically, in initial stages of valve opening, the three solenoid-operated on-off valves 284, 288 and 294 are energized while the solenoid-operated on-off valve 292 remains de-energized. Thus, the first pilot port 24b is brought out of communication with the pilot pump 282 and reservoir 290 and the second pilot port 32b receives a supply of pilot pressure signal of high pressure level from the pilot pump 282 through the on-off valve 292. The pilot pressure signal, inputted to the second pilot port 32b, moves the valve body 10b in a valve opening direction, and the working fluid in the first pilot chamber 20b is not discharged through the first pilot port 24b to the reservoir 290. What is discharged is just enough to move the piston 300 of the accumulator 298 rearwardly, so that the valve body 10b stops after moving a small distance and leaves the valve in half-open position. Thereafter, the solenoid-operated on-off valve 292 is energized and the first pilot port 24b is communicated with the reservoir 290 through the on-off valve 292, so that the valve body 10b further moves in the valve opening direction to bring the valve to full open position. Due to the fact that the valve is opened while shifting stepwise from half-open position to full-open position, changes occurring in the pressure and flow rate of a fluid flowing through a main circuit connected to the first pilot port 24b and second pilot port 32b can be made to take place stepwise, to thereby further reduce a shock given to the logic valve at the time it is opened.

When the stroke of the valve body 10b need be of a small magnitude when the valve is in half-open position, the accumulator 298 may eliminated because the resilience of the working fluid naturally functions as an accumulator.

It is to be understood that the logic valve combined with the solenoid-operated on-off valves need not be the embodiment thereof shown in FIG. 3 and that the logic valve control means can be used in combination with any logic valve shown in FIGS. 1-8.

What is claimed is:

1. A fluid control valve apparatus including:
logic valve means comprising:
a valve housing;
a first substantially circular valve chamber defined in the valve housing;
a valve body arranged in the first valve chamber for fluidtight movement in an axial direction, the valve body including opposite end portions and a conical surface portion;
a substantially circular valve seat adapted to be brought into fluidtight sealing contact with the conical surface portion of the valve body when the valve body moves in a valve closing direction;
a first hydraulic fluid chamber and a second hydraulic fluid chamber defined in the valve housing and adapted to be brought into communication with each other when the conical surface portion of the valve body is released from contact with the valve seat and brought out of communication with each other when the conical surface portion of the valve body is brought into contact with the valve seat; and
a first pilot chamber defined in the valve housing adjacent one end portion of the valve body and operative to force the valve body to move in the valve closing direction by a first pilot pressure signal received therein;
wherein the logic valve means further comprises:
a second substantially circular valve chamber defined in the valve housing;
a valve body extension formed by extending the other end portion of the valve body through the first hydraulic fluid chamber and arranged in the second valve chamber for fluidtight movement in an axial direction; and
a second pilot chamber defined in the valve housing adjacent an end of the valve body extension and operative to force the valve body extension to move in a valve opening direction by a second pilot pressure signal received therein;
said first valve chamber, said second valve chamber and said valve seat being of such diameter that when the conical surface portion of the valve body is brought into contact with the valve seat to bring said first and second hydraulic fluid chambers out of communication with each other, the fluid pressures acting on the valve body in each of said first and second hydraulic fluid chambers are balanced so as to apply no net force in an axial direction of said valve body;
said first valve chamber being defined by an inner peripheral surface of a sleeve fitted in said valve housing, said one end portion of the valve body being disposed in said inner peripheral surface of the sleeve for sealing movement in an axial direction;
said conical surface portion of the valve body having a portion of the maximum diameter positioned in said second hydraulic fluid chamber, said sleeve having an outer diameter larger than a maximum diameter of the conical surface portion and an inner diameter less than the maximum diameter whereby the valve body can be inserted into and withdrawn out of the valve housing in an axial direction with the sleeve being removed therefrom upon assembly and disassembly of the valve means; and
wherein said valve body has a peripheral wall portion defining a pressure regulating chamber positioned between said opposite end portions, and a communicating duct formed therein and communicating said pressure regulating chamber with said first hydraulic fluid chamber, said second valve chamber having a diameter less than the diameter of the valve seat and said peripheral wall portion being configured such that a cross-sectional area thereof is substantially equal to a difference between the square of the diameter of the valve seat and a square of the diameter of the second valve chamber multiplied by $\pi$.

2. A fluid control valve apparatus as claimed in claim 1, wherein said peripheral wall portion comprises a smaller diameter portion of said valve body formed on the side of said first valve chamber, said pressure regulating chamber is defined between said smaller diameter portion of said valve body and the inner wall surface of said sleeve defining the first valve chamber, and wherein said smaller diameter portion of the valve body has a diameter being sized so that the difference between a square of the diameter of the first valve chamber and a square of the diameter of the smaller diameter portion multiplied by $\pi$ equals the peripheral wall area.

3. A fluid control valve apparatus as claimed in claim 1; wherein said logic valve means further comprises damper means located adjacent an end of the valve body extension for abutting engagement with the end immediately before the valve body is brought into contact with the valve seat.

4. A fluid control valve apparatus as claimed in claim 3, wherein said damper means comprises a damper piston adapted to be brought into abutting engagement with the end of the valve body extension, a damper chamber formed to face a side of the damper piston opposite to the valve body, spring means for biasing said damper piston toward the valve body, and an orifice formed in the damper piston for maintaining said damper chamber in communication with outside.

5. A fluid control apparatus as claimed in claim 4, wherein said damper piston is formed with a communicating passageway for maintaining said damper chamber in communication with outside, and a check valve mounted in said communicating passageway.

6. A fluid control valve apparatus as claimed in claim 1, wherein said sleeve comprises a sleeve body defining said first valve chamber, and a positioning flange located adjacent the first pilot chamber, said sleeve body being loosely fitted in the valve housing and said flange being fluidtightly arranged in the valve chamber through seal rings interposed between side surfaces of the flange and the valve housing.

7. A fluid control valve apparatus as claimed in claim 1, wherein the valve seat of the logic valve means is in the form of a conical convex surface having a greater vertical angle than the conical surface portion of the valve body and the difference in vertical angle between them is in a predetermined range.

8. A fluid control valve apparatus as claimed in claim 7, wherein the vertical angle of the conical surface portion of the valve body is below 90°.

9. A fluid control valve apparatus as claimed in claim 7, wherein the difference in vertical angle between them is in the range between 10° and 40°.

10. A fluid control valve apparatus as claimed in claim 1, further comprising logic valve control means comprising reference pressure setting means for applying a substantially constant reference pressure at all times to the first pilot chamber of the logical valve means as a first pilot pressure signal, and switch means for applying to the second pilot chamber of the logic valve means as a second pilot pressure signal a first predetermined pressure higher than the reference pressure when the valve is to be opened and applying to the second pilot chamber of the logic valve means as a second pilot pressure signal a second predetermined pressure lower than the reference pressure when the valve is to be closed.

11. A fluid control valve apparatus as claimed in claim 10, wherein said reference pressure setting means comprises a pressure reducing valve connected to a pilot pump, and a relief valve connected to the first pilot chamber of the logic valve means in parallel with said pressure reducing valve.

12. A fluid control valve apparatus as claimed in claim 1, further comprising logic valve control means comprising first switch means for applying a first predetermined pressure of a relatively high level as a first pilot pressure signal to the first pilot chamber of the logic valve means when the logic valve means is to be closed and applying a second predetermined pressure of a relatively low level to the first pilot chamber when the logic valve means is to be opened, and second switch means for applying a third predetermined pressure of a relatively low level to the second pilot chamber of the logic valve means as a second pilot pressure signal when the logic valve means is to be closed and applying a fourth predetermined pressure of a relatively high level to the second pilot chamber when the logic valve means is to be opened.

13. A fluid control valve apparatus as claimed in claim 12, wherein said first switch means comprises a first on-off valve connected to a pilot pump, and a second on-off valve connected to a reservoir, said first and second on-off valves being connected to the first pilot chamber in parallel with each other, and wherein said second switch means comprises a third on-off valve connected to the pilot pump, and a fourth on-off valve connected to said reservoir, said third and fourth on-off valves being connected to the second pilot chamber in parallel with each other.

14. A fluid control valve apparatus as claimed in claim 13, wherein said first switch means further comprises accumulator means connected to the first pilot chamber in parallel with said first and second on-off valves.

15. A fluid control valve apparatus including:
logic valve means comprising:
a valve housing;
a first valve chamber defined in the valve housing;
a valve body arranged in the first valve chamber for fluidtight movement in an axial direction, the valve body including opposite end portions and a conical surface portion;
a valve seat adapted to be brought into fluidtight sealing contact with the conical surface portion of the valve body when the valve body moves in a valve closing direction;
a first hydraulic fluid chamber and a second hydraulic fluid chamber defined in the valve housing and adapted to be brought into communication with each other when the conical surface portion of the valve body is released from contact with the valve seat and brought out of communication with each other when the conical surface portion of the valve body is brought into contact with the valve seat; and
a first pilot chamber defined in the valve housing adjacent one end portion of the valve body and operative to force the valve body to move in the valve closing direction by a first pilot pressure signal received therein;
wherein the logic valve means further comprises:
a second valve chamber defined in the valve housing;
a valve body extension formed by extending the other end portion of the valve body through the first hydraulic fluid chamber and arranged in the second valve chamber for fluidtight movement in an axial direction;
a second pilot chamber defined in the valve housing adjacent an end of the valve body extension and operative to force the valve body extension to move in a valve opening direction by a second pilot pressure signal received therein;
logic valve control means comprising reference pressure setting means for applying a substantially constant reference pressure at all times to the first pilot chamber of the logic valve means as the first pilot pressure signal;
switch means for applying to the second pilot chamber of the logic valve means as a second pilot pressure signal a first predetermined pressure higher than the reference pressure when the valve is to be opened and applying to the second pilot chamber of the logic valve means as a second pilot pressure signal a second predetermined pressure lower than the reference pressure when the valve is to be closed; and wherein said switch means comprises a first on-off valve connected to a pilot pump, and a second on-off valve connected to a reservoir, said first and second on-off valves are connected to the second pilot chamber of the logic valve means in parallel with each other.

16. A fluid control valve apparatus as claimed in claim 15, wherein said first and second on-off valves comprise high-speed, solenoid-operated on-off valves, and said logic valve control means comprise pulse producing means for providing pulse outputs to electromagnetic means of said solenoid-operated on-off valves.

17. A fluid control valve apparatus as claimed in claim 16, wherein each said high-speed, solenoid-operated on-off valve includes a valve body formed with a conical surface portion adapted to be brought into and out of a valve seat.

18. A fluid control valve apparatus as claimed in claim 16, wherein said pulse producing means comprises pulse duration modulating means for regulating the pulse duration of pulses produced thereby.

19. A fluid control valve apparatus as claimed in claim 16, wherein said pulse producing means comprises frequency modulating means for regulating the frequency of pulses produced thereby.

20. A fluid control valve apparatus including:
logic valve means comprising:
a valve housing;
a first valve chamber defined in the valve housing;
a valve body arranged in the first valve chamber for fluidtight movement in an axial direction, the valve body including opposite end portions and a conical surface portion;

a substantially circular valve seat adapted to be brought into fluidtight sealing contact with the conical surface portion of the valve body when the valve body moves in a valve closing direction;

a first hydraulic fluid chamber and a second hydraulic fluid chamber defined in the valve housing and adapted to be brought into communication with each other when the conical surface portion of the valve body is released from contact with the valve seat and brought out of communication with each other when the conical surface portion of the valve body is brought into contact with the valve seat; and a first pilot chamber defined in the valve housing adjacent one end portion of the valve body and operative to force the valve body to move in the valve closing direction by a first portion pressure signal received therein;

wherein the logic valve means further comprises:

a second valve chamber defined in the valve housing;

a valve body extension formed by extending the other end portion of the valve body through the first hydraulic fluid chamber and arranged in the second valve chamber for fluidtight movement in an axial direction;

a second pilot chamber defined in the valve housing adjacent an end of the valve body extension and operative to force the valve body extension to move in a valve opening direction by a second pilot pressure signal received therein;

the first and second pilot chamber connected to independently controlled hydraulic pressure sources; and wherein said logic valve means further comprises a rod means secured to the valve housing and extending in an axial direction to the first pilot chamber, a further chamber defined in said valve body and receiving said rod means for reciprocatory sliding movement, said further chamber defining a pressure regulating chamber therein between a wall surface thereof and an end portion of said rod means, and a communicating duct formed in the valve body and communicating said pressure regulating chamber with said first hydraulic fluid chamber, and wherein said second valve chamber has a diameter less than the diameter of the valve seat and said rod means has a diameter set at a value such that a square of the diameter is substantially equal to a difference between a square of the diameter of the valve seat and the square of the diameter of the second valve chamber multiplied by $\pi$.

* * * * *